United States Patent
Park et al.

(10) Patent No.: US 8,091,823 B2
(45) Date of Patent: Jan. 10, 2012

(54) FLAPPING APPARATUS WITH LARGE FLAPPING ANGLES

(75) Inventors: Hoon Cheol Park, Seoul (KR); Quoc Viet Nguyen, Seoul (KR); Do Young Byun, Seoul (KR); Nam Seo Goo, Seoul (KR)

(73) Assignee: Konkuk University Industrial Cooperation Corp., Seoul (KR)

( * ) Notice: Subject to any disclaimer, the term of this patent is extended or adjusted under 35 U.S.C. 154(b) by 525 days.

(21) Appl. No.: 12/571,945

(22) Filed: Oct. 1, 2009

(65) Prior Publication Data

US 2010/0308158 A1  Dec. 9, 2010

(30) Foreign Application Priority Data

Jun. 8, 2009 (KR) .................. 10-2009-0050397

(51) Int. Cl.
  *B64C 33/00* (2006.01)
(52) U.S. Cl. ............................... 244/22; 446/35
(58) Field of Classification Search .............. 244/22; 446/35; 416/83

See application file for complete search history.

(56) References Cited

U.S. PATENT DOCUMENTS

| | | | | |
|---|---|---|---|---|
| 792,154 A * | 6/1905 | McMullen | ...................... | 244/22 |
| 1,117,585 A * | 11/1914 | Marchall | ........................ | 244/22 |
| 1,450,480 A * | 4/1923 | Buck | ............................... | 244/22 |
| 5,170,965 A * | 12/1992 | Yasuda | ........................... | 244/64 |
| 6,824,094 B2 * | 11/2004 | Richard | ........................... | 244/11 |
| 7,651,051 B2 * | 1/2010 | Agrawal et al. | ................ | 244/22 |
| 2003/0054724 A1 * | 3/2003 | Tomas | ........................... | 446/35 |
| 2004/0195436 A1 * | 10/2004 | Sinclair | ........................... | 244/49 |
| 2010/0288871 A1 * | 11/2010 | Hwang et al. | .................... | 244/22 |

OTHER PUBLICATIONS

"Design of a motor-driven flapper mimicking beetle flight" and "Artificial foldable wing mimicking folding and unfolding motions of beetle hind wings", presented by Hoon Cheol Park et al., Korean Society of Mechanical Engineers, May 21, 2009.

* cited by examiner

*Primary Examiner* — Christopher P Ellis
(74) *Attorney, Agent, or Firm* — LRK Patent Law Firm

(57) ABSTRACT

The present invention provides a flapping apparatus with a large flapping angle. The flapping apparatus includes a frame, a drive motor, a slider, connection links, actuating links and wings. The frame includes I-shaped plates which face each other in parallel, and coupling rods which couple the opposite corners of the upper ends of the I-shaped plates to each other. The drive motor is fastened to the frame such that a rotating shaft thereof is disposed inside the frame. The slider includes lateral bars which are reciprocated upwards and downwards. The connection links are rotatably coupled at first ends thereof to both ends of the lateral bar. The actuating links are rotatably coupled at first ends thereof to second ends of the connection links. The actuating links are rotatably coupled at second ends thereof to the coupling rods. The wings are respectively attached to the upper surfaces of the actuating links.

3 Claims, 9 Drawing Sheets

FLAPPING APPARATUS WITH LARGE FLAPPING ANGLES

BACKGROUND OF THE INVENTION

1. Field of the Invention

The present invention relates generally to flapping apparatuses with large flapping angles and, more particularly, to a flapping apparatus which installed in a micro ornithopter and flaps the wings at relatively large angles. Therefore, even though the size of the wings of an ornithopter becomes smaller to reduce the size and weight of the entire body, the dynamic lift sufficient to fly the ornithopter can be generated.

2. Description of the Related Art

Generally, an ornithopter is an aircraft that flies by flapping its wings. Ornithopter research has been steadily conducted since Leonardo da Vinci's design of 1490, and the techniques pertaining thereto have made great and rapid advances. To date, a variety of ornithopters have been introduced. These ornithopters are being widely used, for example, not only as simple toys but also for industrial and military purposes, because remarkable effects can be obtained from the use of the ornithopters.

Meanwhile, conventional ornithopters use an engine, rubber band or compressed gas as a power source. An ornithopter with an engine has large output but is very noisy. In addition, it is not easy for a beginner to handle the engine and the fuel. In the case of a rubber band powered ornithopter or a compressed gas powered ornithopter, it is easy to handle the ornithopter but the flying time is relatively short and a user cannot easily control the direction or altitude thereof.

Recently, the development of a motor powered ornithopter is being promoted by rapid advances in motor and battery performance. The motor powered ornithopter does not require a separate engine or fuel, because it is operated by using a motor and a battery. Furthermore, if the battery is in the fully charged state, the ornithopter can fly for a long time. As well, reliable and smooth power transmission mechanism can realized.

The motor powered ornithopter constructed such that a power transmission unit is operated by a drive gear connected to a rotating shaft of the motor. Power required to flap the wings at an appropriate speed to produce the dynamic lift is transmitted to the wings by the power transmission unit. Furthermore, the wings are connected to the power transmission unit through a connecting rod that converts the rotation of the rower transmission unit into linear motion.

However in the conventional technique, the dynamic lift can be insufficient to lift a micro ornithopter, because the flapping angles of the wings are relatively small.

SUMMARY OF THE INVENTION

Accordingly, the present invention has been made keeping in mind the above problems occurring in the prior art, and an object of the present invention is to provide a flapping apparatus which is installed in a micro ornithopter and flaps the wings at relatively large angles, and in which even though the wings of the ornithopter are made smaller to reduce the size and weight of the entire body, dynamic lift sufficient to fly the ornithopter can be generated.

In order to accomplish the above object, the present invention provides a flapping apparatus, including: a frame comprising: a pair of I-shaped plates spaced apart from each other by a predetermined distance, the I-shaped plates facing each other and being parallel to each other; and a pair of coupling rods coupling opposite corners of upper ends of the I-shaped plates to each other; a drive motor fastened to a portion of the frame such that a rotating shalt thereof is disposed inside the frame; a slider comprising a lateral bar to be reciprocated upwards and downwards by a convert module converting a rotating force of the drive motor into a vertical reciprocating force; a pair of connection links respectively coupled at first ends thereof to both ends of the lateral bar so as to be rotatable; a pair of actuating links respectively coupled at first ends thereof to second ends of the connection links so as be rotatable, the actuating links being respectively coupled at second ends thereof to the coupling rods so as to be rotatable; and a pair of wings respectively attached to upper surfaces of the actuating links.

Each of the connection links may have an arc shape.

The convert module may include: a drive gear coaxially coupled to the rotating shaft of the drive motor; a reduction gear engaging with the drive gear, the reduction gear reducing a rotating speed of the drive motor; and a crank shaft provided on a surface of the reduction gear at a position which is radially spaced apart from the rotating shaft of the reduction gear by a predetermined distance, the crank shaft rotating around the rotating shaft of the reduction gear depending on rotation of the reduction gear. The lateral bar of the slider may comprise a pair of lateral parallel bars provided on opposite sides of the crank shaft. The lateral parallel bars may face each other and be parallel to each other. The slider may further comprise vertical guide rods to guide the lateral parallel bars such that the lateral parallel bars move upwards and downwards.

BRIEF DESCRIPTION OF THE DRAWINGS

The above and other objects, features and advantages of the present invention will, be more clearly understood from the following detailed description taken in conjunction with the accompanying drawings, in which.

DESCRIPTION OF THE PREFERRED EMBODIMENTS

To reduce the size of a micro ornithopter, not only the size and weight of a fuselage but also the size of the wings must be reduced. However, the reduction in the size of the wings reduces the dynamic lift that allows the micro ornithopter to rise. Therefore, the flapping angles of the wings must be increased and the frequency of flapping must also be relatively high to ensure sufficient dynamic lift, to compensate for the wing size reduction.

The flapping principle of a beetle can be used as reference data to design such a micro ornithopter. The beetle has a flapping angle of about 160° and a flapping frequency of about 30 Hz when flying.

A flapping apparatus with a large flapping angle according to an embodiment of the present invention is an insect-mimicking flapping apparatus which implements motion similar to the flapping of an insect, such as a beetle, having large flapping motion.

Figure 8:
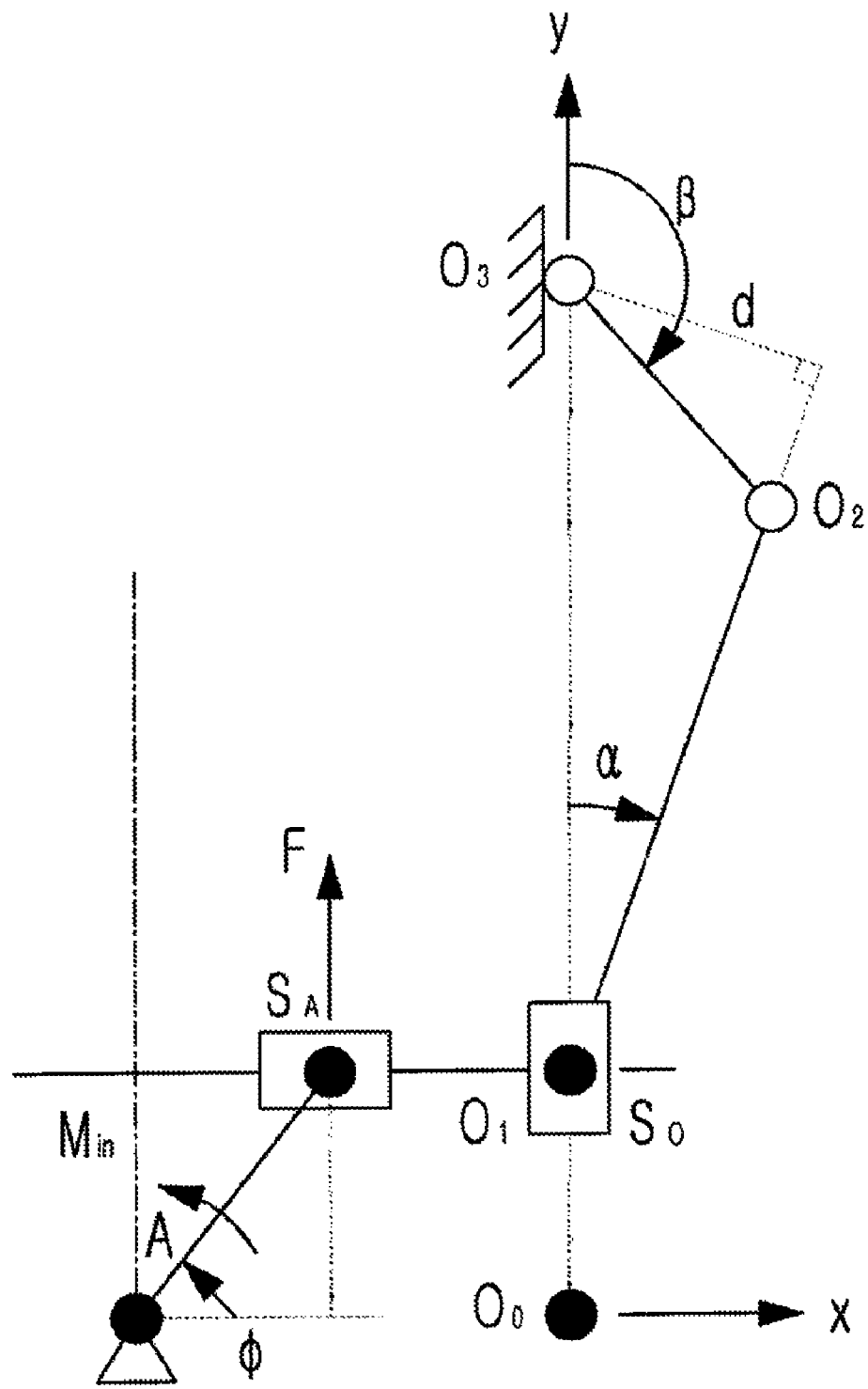
FIG. 8 is a view illustrating the concept of the flapping operation of the flapping apparatus according to the embodiment of the present invention.

FIG. 8 is a conception view showing a right side of a connection unit which converts the rotation of a motor into large flapping motion. A y-axis denotes an axis along which a vertical slider $S_0$ attached to a point $0_1$ moves upwards or downwards. A first end of a link A is connected to a drive shaft of a motor, and a second end thereof is coupled to a horizontal slider $S_A$ by a hinge. The horizontal slider $S_A$ moves to the left and right by the rotating torque of the motor on a horizontal link having the point $0_1$ in a direction of an x-axis. Simultaneously, the horizontal link including the point $O_1$ moves upwards and downwards along the y-axis due to vertical force F generated by the torque of the motor. At this time, the vertical slider $S_0$ which is provided on the end of the horizontal link slides upwards and downwards along the y-axis by the length of the link. A. A point $O_3$ is a fixed point. Hence, the following vector formula is obtained from the relationship among these points.

$$\overline{O_0O_3} = \overline{O_0O_1} + \overline{O_1O_3} \quad (1)$$

As shown in FIG. 8, the distance relationship between the points is as follows.

$$\overline{O_0O_3} = \overline{O_0O_1} + \overline{O_1O_2}\cos\alpha - \overline{O_2O_3}\cos\beta \quad (2)$$

$$\overline{O_1O_2}\sin\alpha = \overline{O_2O_3}\sin\beta \quad (3)$$

$$\overline{OO_1} = A\sin\phi \quad (4)$$

Here, the reference character A denotes vertical movement amplitude of the horizontal link or the length of the link A. The reference character $\phi$ denotes a rotation angle defined by the rotation of the motor. From these numerical formulas, a flapping angle $\beta$ is expressed as the following formula.

$$\beta = \cos^{-1}\left[\frac{-(\overline{O_oO_3} - A\sin\phi)^2 - \overline{O_2O_3^2} + \overline{O_1O_2^2}}{2\overline{O_2O_3}(\overline{O_oO_3} - A\sin\phi)}\right] \quad (5)$$

When an angular velocity of rotation of the motor is designated by the reference character $\omega$, $\phi=\omega t$ is obtained. Since $\omega=2\pi f$, the rotation angle of the link A is expressed as $\phi=2\pi ft$. In addition, the frequency f is the reciprocal of T. Thus, when $\phi=2\pi t/T$ is substituted into the equation (5), the flapping angle $\beta$ can be expressed with respect to the passing of time.

Figure 9:
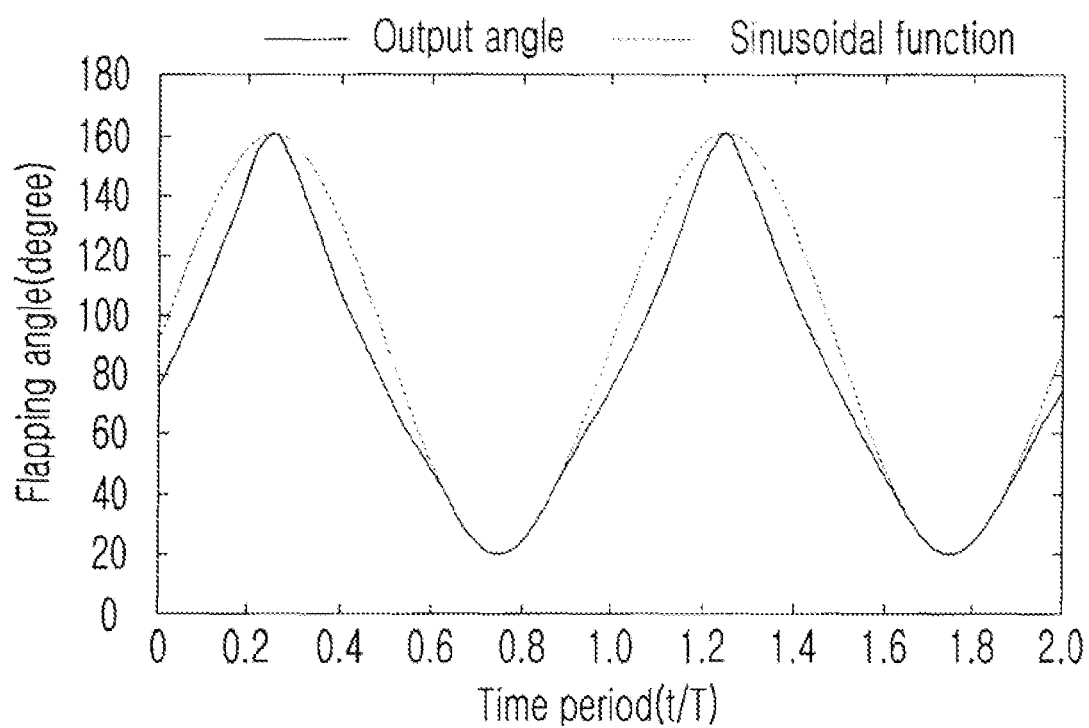
FIG. 9 is a graph showing the flapping angle as a function of the time passage according to the embodiment of the present invention.

FIG. 9 is a graph showing the flapping angle as a function of the time passage, when the lengths of $\overline{O_0O_1}$, $\overline{O_1O_2}$ and $\overline{O_2O_3}$ respectively are 3.76 mm, 7 mm and 4 mm. As can be understood from this graph, the flapping angle of about 140° can be obtained. Therefore, it is expected that if the connection unit and the motor are appropriately designed, a relatively large flapping angle similar to that of a beetle can be obtained.

The present invention will be more clearly understood from the following preferred embodiment taken in conjunction with the accompanying drawings. Hereinafter, the preferred embodiment of the present invention will be described in detail such at those skilled in the art can easily understand and implement the present invention.

Figure 1:
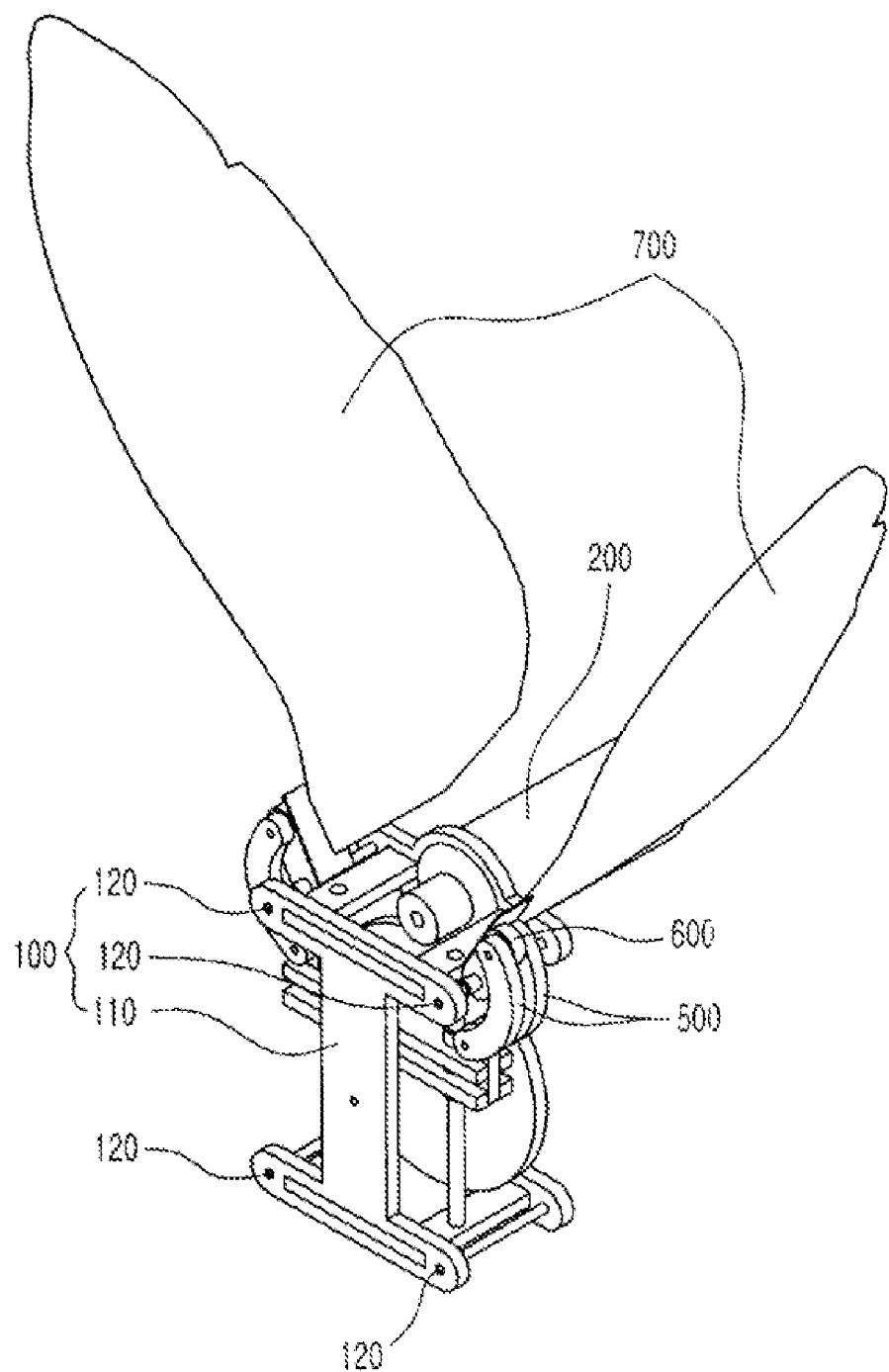
FIG. 1 is a perspective view of a flapping apparatus with a large flapping angle, according to an embodiment of the present invention.
Figure 2:
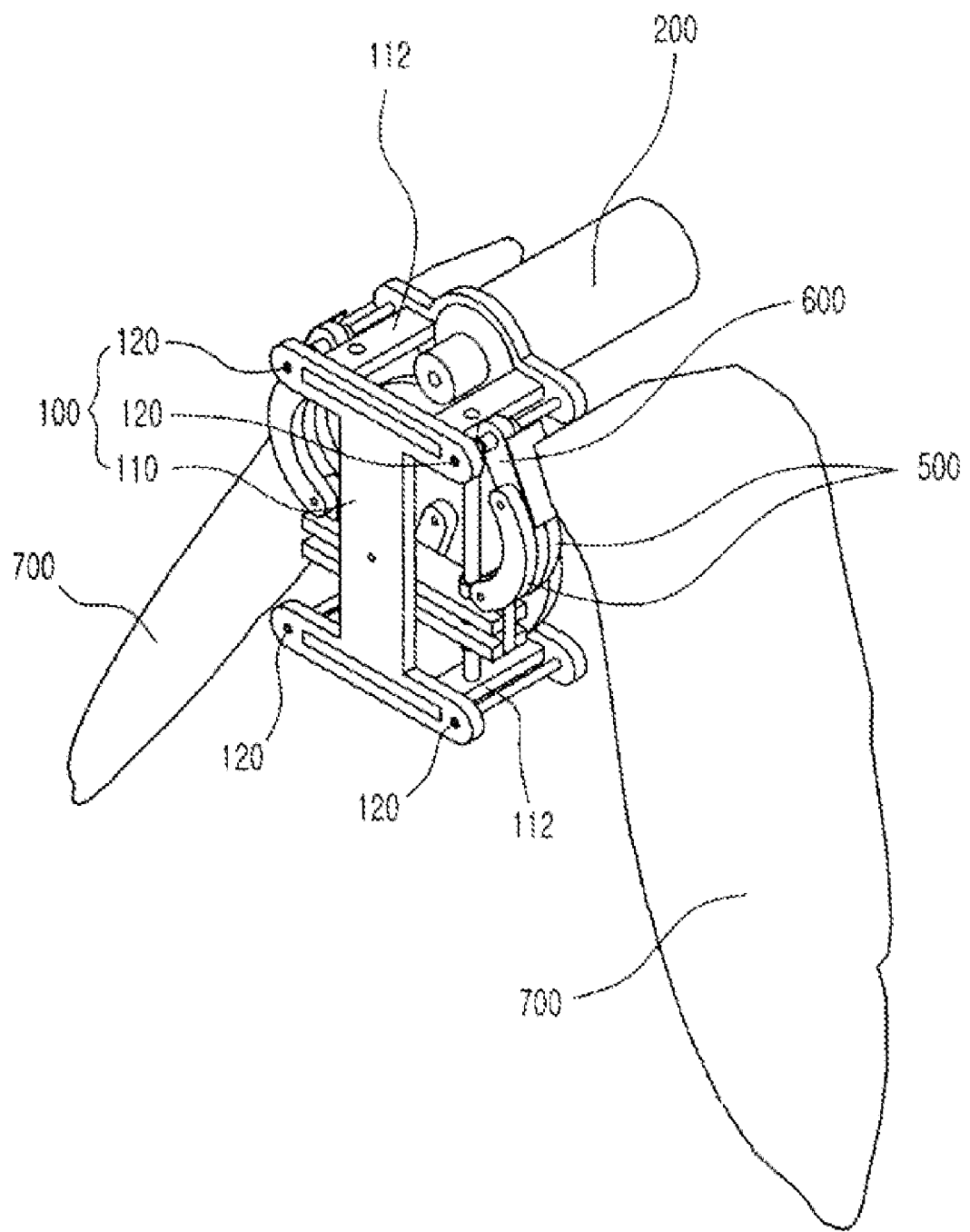
FIG. 2 is another perspective view of the flapping apparatus according to the embodiment of the present invention.
Figure 3:
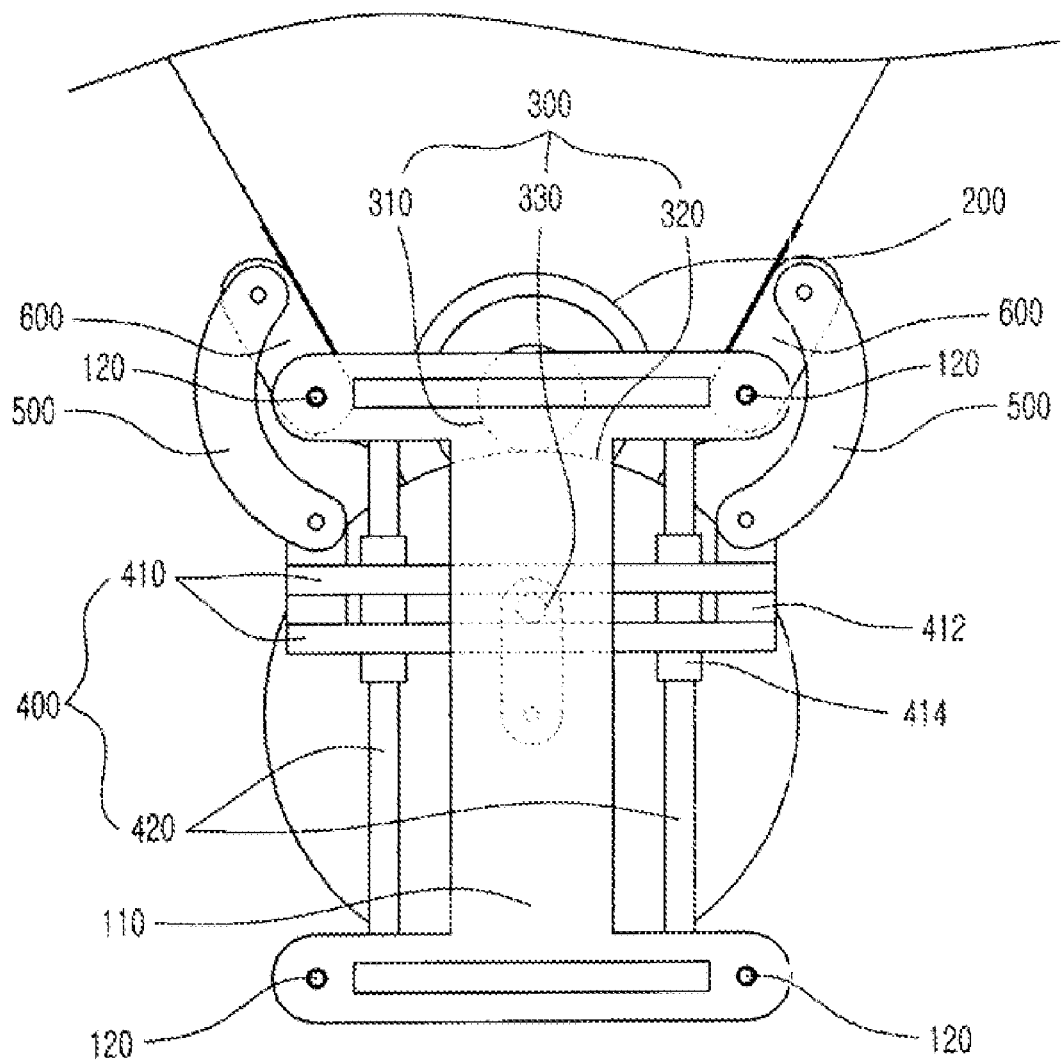
FIG. 3 is a front view of the flapping apparatus according to the embodiment of the present invention.

As shown in FIGS. 1 through 3, a flapping apparatus with a large flapping angle according to the embodiment of the present invention includes a frame 100, a drive motor 200, a slider 400, connect on links 500, actuating links 600 and wings 700.

The frame 100 includes a pair of I-shaped plates 110 and a pair of coupling rods 120. In detail, the two I-shaped plates 110 are spaced apart from each other by a predetermined distance and face each other and are parallel to each other. The coupling rods 120 couple the opposite corners of the upper ends of the two I-shaped plates 110 to each other. A pair of coupling rods 120 may be further provided to couple the opposite corners of the lower ends of the two I-shaped plates 110 to each other.

As such, the frame 100 comprises the two I-shaped plates 110 which face each other and are parallel to each other, and the coupling rods 120 which couple the corners of the upper and lower ends of the two I-shaped plates 110 to each other.

The drive motor 200 is fastened to a portion of the frame 100 and is oriented such that the rotating shaft thereof is disposed inside the frame 100. In detail, the drive motor 200 is fastened to the upper end one of the I-shaped plates 110 constituting the frame 100. A circular mounting hole to which the drive motor 200 is mounted may be formed in the corresponding I-shaped plate 110.

The slider 400 includes lateral parallel bars 410 which are reciprocated upwards and downwards by a convert module 300 which converts the rotating force of the drive motor 200 into vertical reciprocating force.

The convert module 300 includes a drive gear 310 which is coaxially coupled to the rotating shaft of the drive motor 200, and a reduction gear 320 which engages with the drive gear 310 to reduce the rotating speed of the drive motor 200. The convert module 300 further includes a crank shaft 330 which is provided on the surface of the reduction gear 320 at a position which is radially spaded apart from the rotating shaft of the reduction gear 320 by a predetermined distance. The crank shaft 330 rotates around the rotating shaft of the reduction gear 320 depending on the rotation of the reduction gear 320. The slider 400 includes the two lateral parallel bars 410 which are provided on opposite sides of the crank shaft 330 and face parallel to each other, and vertical guide rods 420 which guide the lateral parallel bars 410 such that the lateral parallel bars 410 move upwards and downwards.

With regard to the operation of the slider 400, the drive gear 310 is rotated by the rotation of the drive motor 200. Simultaneously, the reduction gear 320 is rotated at a reduced speed by the rotation of the drive gear 310. Thereby, the crank shaft 330 rotates around the rotating shaft of the reduction gear 320. The lateral parallel bars 410 are moved upwards and downwards by the rotation of the crank shaft 330 under the guidance of the vertical guide rods 420.

Meanwhile, support links are provided on both ends of the lateral parallel bars 410 constituting the slider 400, so that the connection links 500 which will be explained later are respectively hinged to the support links.

The connection links 500 are respectively coupled at first ends thereof to both ends of the slider 400 so as to be rotatable. In detail, the connection links 500 are rotatably hinged to the slider 400 through the support links which are provided on both ends of the lateral parallel bars 410 of the slider 400. The two actuating links 600 are respectively hinged at first ends thereof to second ends of the connection links 500 so as to be rotatable. The two actuating links 600 are respectively coupled at second ends thereof to the coupling rods 120 so as to be rotatable. Furthermore, the two wings 700 are respectively attached to the upper surfaces of the actuating links 600. Each connection link 500 has an arc shape to prevent the connection link 500 from coming into contact with the corresponding coupling rod 120 when the wings 700 flap at large flapping angles.

Therefore, when the lateral parallel, bars 410 of the slider 400 move upwards and downwards under the guidance of the vertical guide rods 420, the actuating links 600 rotate in conjunction with the connection links 500, thus flapping the wings 700.

The operation of the flapping apparatus according to the embodiment of the present invention having the above-mentioned construction will be explained with reference to FIGS. 4 through 7.

Figure 4:
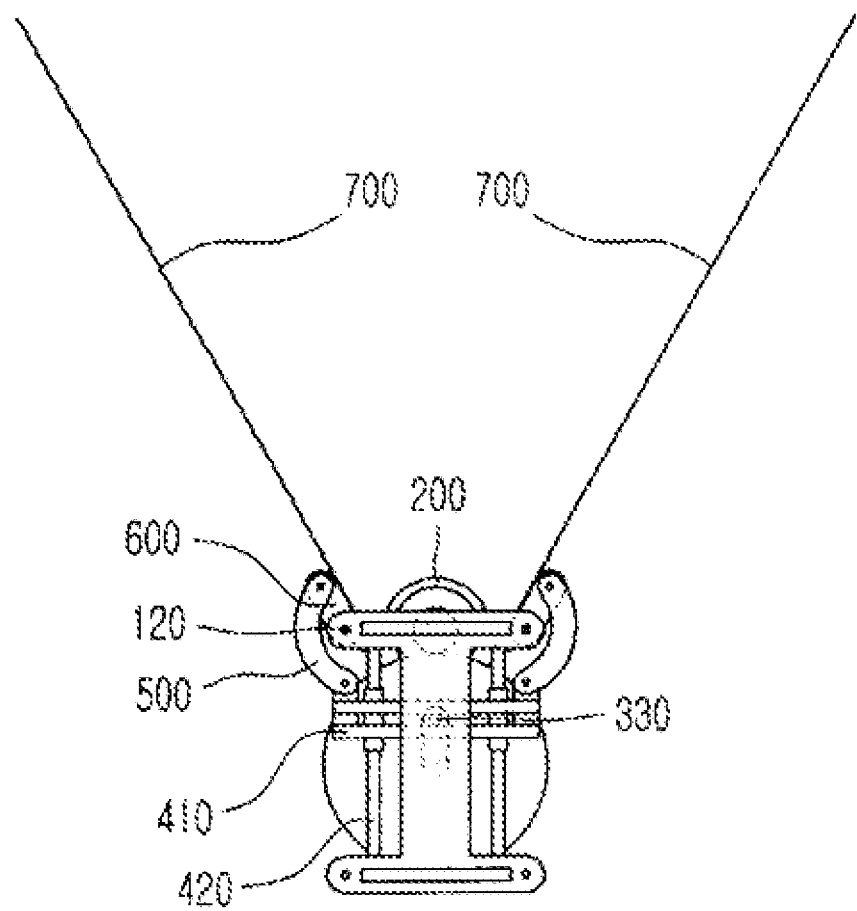
FIGS. 4 through 7 are front views showing the operation of the flapping apparatus according to the embodiment of the present invention.

A shown in FIG. 4, when the crank shaft 330 is moved in the 12 o'clock direction with respect to the rotating shaft of the reduction gear 320, the lateral parallel bars 410 of the slider 400 are moved on the vertical guide rods 420 to the uppermost position at which the lateral parallel bars 410 can no longer move upwards. The connection link 500 and the actuating link 600 are operated in conjunction with each other by the movement of the lateral parallel bars 410 such that the wings 700 that are attached to the upper surfaces of the actuating link 600 are oriented upwards.

Here, because each connection link 500 has an arc shape when the wings 700 flap at large angles, the connection links 500 can be prevented from coming contact with the corresponding coupling rods 120, as shown in FIG. 4.

Figure 5:
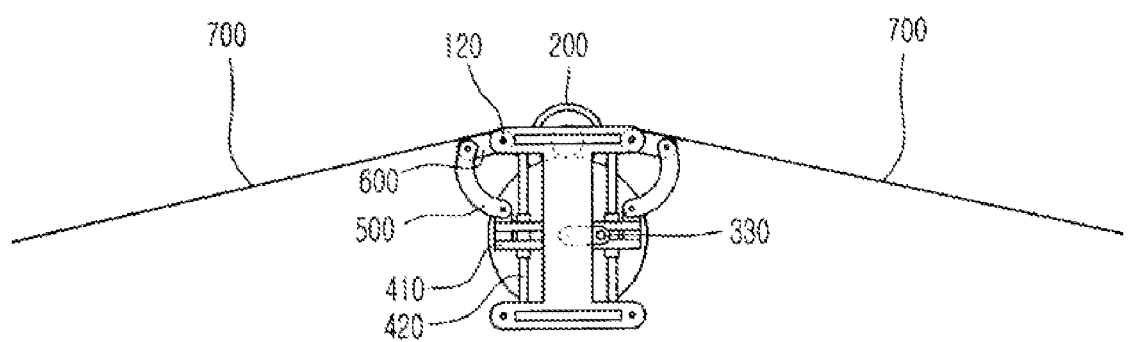

As shown in FIG. 5, when the crank shaft 330 is moved in the 3 o'clock direction with respect to the rotating shaft of the reduction gear 320, the lateral parallel bars 410 of the slider 400 are disposed at the medial position between the uppermost position and the lowermost position between which the lateral parallel bars 410 move on the vertical guide rods 420 upwards and downwards. The connection link 500 and the actuating link 600 are operated in conjunction with each other by the movement of the lateral parallel bars 410 such that the wings 700 that are attached to the upper surfaces of the actuating link 600 are oriented in the opposite transverse directions.

Figure 6:
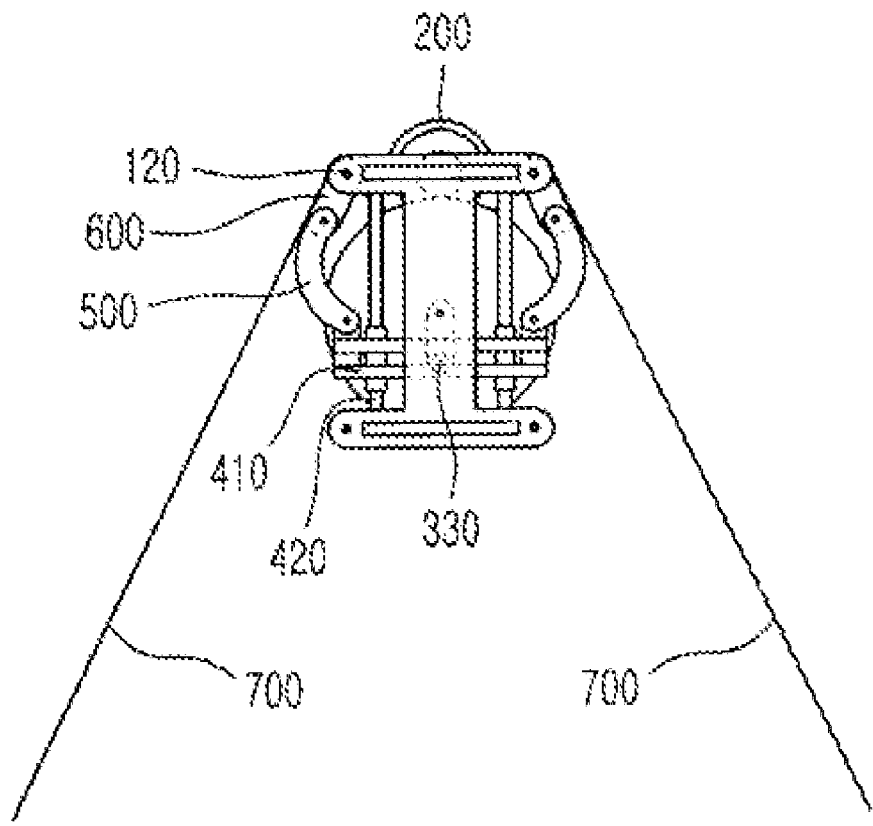

As shown in FIG. 6, when the crank shaft 330 is moved in the 6 o'clock direction with respect to the rotating shaft of the reduction gear 320, the lateral parallel bars 410 of the slider 400 are moved on the vertical guide rods 420 to the lowermost position at which the lateral parallel bars 410 can no longer move downwards. The connection rink 500 and the actuating link 600 are operated in conjunction with each other by the movement, of the lateral parallel bars 410 such that the wings 700 that are attached to the upper surfaces of the actuating link 600 are oriented downwards.

Figure 7:
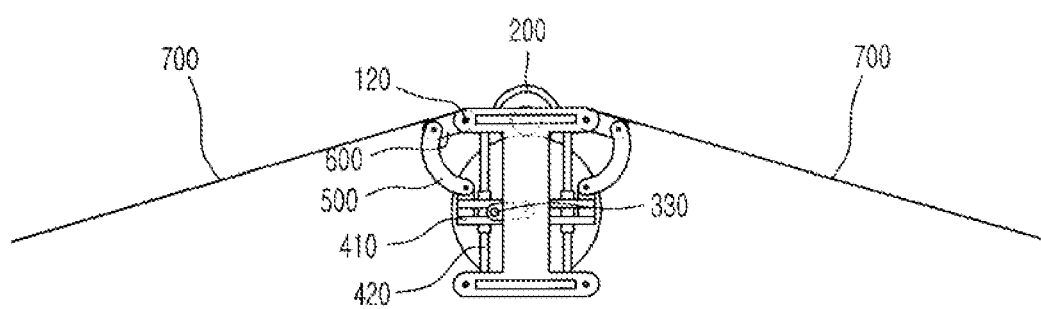

As shown in FIG. 7, when the crank shaft 330 is moved in the 9 o'clock direction with respect to the rotating shaft of the reduction gear 320, the lateral parallel bars 410 of the slider 400 are disposed at the medial position between the uppermost position and the lowermost position between which the lateral parallel bars 410 move on the vertical guide rods 420 upwards and downwards. The connection link 500 and the actuating link 600 are operated in conjunction with each other by the movement of the lateral parallel bars 410 such that the wings 700 that are attached to the upper surfaces of the actuating link 600 are oriented in the opposite transverse directions.

The flapping operation can be realized by continuously repeating the states of FIGS. 4 through 7.

As described above, the present invention provides a flapping apparatus which is installed in a micro ornithopter and flaps the wings at relatively large angles. Therefore, even though the size of the wings of the ornithopter becomes smaller to reduce the size and weight of the entire body, the dynamic lift sufficient to fly the ornithopter can be generated.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A flapping apparatus, comprising:
   a pair of I-shaped plates spaced apart from each other by a predetermined distance, the I-shaped plates facing each other and being parallel, to each other; and a pair of coupling rods coupling opposite corners of upper ends of the I-shaped plates to each other;
   a drive motor fastened to a portion of the frame such that a rotating shaft thereof is disposed inside the frame;
   a slider comprising a lateral bar to be reciprocated upwards and downwards by a convert module converting a rotating force of the drive motor into a vertical reciprocating force;
   a pair of connection links respectively coupled at first ends thereof to both ends of the lateral bar so as to be rotatable;
   a pair of actuating links respectively coupled at first ends thereof to second ends of the connection links so as to be rotatable, the actuating links being respectively coupled at second ends thereof to the coupling rods so as to be rotatable; and
   a pair of wings respectively attached to upper surfaces of the actuating links.

2. The flapping apparatus as set forth in claim 1, wherein each of the connection links has an arc shape.

3. The flapping apparatus as set forth in claim 1, wherein the convert module comprises:
   a drive gear coaxially coupled to the rotating shaft of the drive motor;
   a reduction gear engaging with the drive gear, the reduction gear reducing a rotating speed of the drive motor; and
   a crank shaft provided on a surface of the reduction gear at a position which is radially spaced apart from the rotating shaft of the reduction gear by a predetermined distance, the crank shaft rotating around the rotating shaft of the reduction gear depending on rotation of the reduction gear, and
   the lateral bar of the slider comprises a pair of lateral parallel bars provided on opposite sides of the crank shaft, the lateral parallel bars facing each other and being parallel to each other, and the slider further comprises vertical guide rods to guide the lateral parallel bars such that the lateral parallel bars move upwards and downwards.

* * * * *